(12) United States Patent
Guiney et al.

(10) Patent No.: US 10,102,529 B2
(45) Date of Patent: Oct. 16, 2018

(54) METHOD AND SYSTEM FOR SECURE CONSUMER IDENTIFICATION

(71) Applicant: MasterCard International Incorporated, Purchase, NY (US)

(72) Inventors: Christopher A. Guiney, Fenton, MO (US); Travis M. Carpenter, Glencoe, MO (US)

(73) Assignee: Mastercard International Incorporated, Purchase, NY (US)

( * ) Notice: Subject to any disclaimer, the term of this patent is extended or adjusted under 35 U.S.C. 154(b) by 108 days.

(21) Appl. No.: 14/197,884

(22) Filed: Mar. 5, 2014

(65) Prior Publication Data

US 2015/0254668 A1    Sep. 10, 2015

(51) Int. Cl.
*G06Q 20/40* (2012.01)
*G06Q 20/34* (2012.01)
*G06Q 20/38* (2012.01)

(52) U.S. Cl.
CPC ....... *G06Q 20/4014* (2013.01); *G06Q 20/347* (2013.01); *G06Q 20/3821* (2013.01); *G06Q 20/4018* (2013.01)

(58) Field of Classification Search
CPC .................................................. G06Q 20/385
USPC .......................................................... 705/35
See application file for complete search history.

(56) References Cited

U.S. PATENT DOCUMENTS

| | | | | |
|---|---|---|---|---|
| 7,912,751 B1* | 3/2011 | Allos | ..................... | G06Q 30/02 |
| | | | | 705/1.1 |
| 2003/0009382 A1* | 1/2003 | D'Arbeloff | ............ | G06Q 20/02 |
| | | | | 705/17 |
| 2006/0237528 A1 | 10/2006 | Bishop et al. | | |
| 2008/0103968 A1 | 5/2008 | Bies et al. | | |
| 2009/0070171 A1* | 3/2009 | Patterson | ............. | G06Q 20/108 |
| | | | | 705/75 |

(Continued)

OTHER PUBLICATIONS

"PCT Notification of Transmittal of the International Search Report and the Written Opinion of the International Searching Authority, or the Declaration", dated Sep. 2, 2015, for International Application No. PCT/US2015/018307, 7pgs.

(Continued)

*Primary Examiner* — William E Rankins
(74) *Attorney, Agent, or Firm* — Buckley, Maschoff & Talwalkar LLC

(57) ABSTRACT

Methods and systems for receiving an authorization request associated with a transaction, the authorization request including a payment account number and a card verification value; determining the authorization request is to be processed as having a dynamic card verification value; automatically bypassing, in response to the determination that the authorization request is to be processed as having a dynamic card verification value, at least one card verification process to be used in a processing of the authorization request; and sending the authorization request to a card verifier to verify the card verification value matches a dynamic card verification value of record. Some methods and systems include transmitting the authorization request to a payment network for authorization of the transaction; receiving an authorization response in reply to the transmitted authorization request; and providing an indication of the authorization response to a merchant associated with the transaction.

16 Claims, 6 Drawing Sheets

(56) References Cited

U.S. PATENT DOCUMENTS

| | | | | |
|---|---|---|---|---|
| 2011/0011931 | A1 | 1/2011 | Farley et al. | |
| 2011/0068170 | A1* | 3/2011 | Lehman | G06Q 30/02 235/380 |
| 2012/0109821 | A1* | 5/2012 | Barbour | G06Q 40/02 705/44 |
| 2012/0191525 | A1* | 7/2012 | Singh | G06O 30/0226 705/14.33 |
| 2013/0290078 | A1* | 10/2013 | Svigals | G06F 21/44 705/14.1 |

OTHER PUBLICATIONS

"Canadian Examination Report", dated May 24, 2017, for Canadian Application No. 2,941,508, 4 pp.
"New Zealand Second Examination Report", dated May 17, 2017, for New Zealand Application No. 723655, 3 pp.
"Singapore Written Opinion", dated Mar. 23, 2017, for Singapore Application No. 11201607116W, 4 pp.
"NZ First Examination Report", dated Dec. 22, 2016, for New Zealand Application No. 723655, 5 pp.
"AU Examination Report No. 1 for Standard Patent Application", dated Mar. 3, 2017, for Australian Application No. 2015225422, 3 pp.
"New Zealand Further Examination Report" dated Aug. 22, 2017 (dated Aug. 22, 2017), New Zealand Patent Office, Application No. 723655, 3 pp.
"Communication: Extended European Search Report" dated Jul. 11, 2017 (dated Jul. 11, 2017), European Patent Office, for European Application No. 15850770.0-1958, 8 pp.

* cited by examiner

100

```
┌─────────────────────────────────────────┐
│                                         │
│  GENERATE CONSUMER IDENTIFICATION (CID) │
│                                    105  │
└─────────────────────────────────────────┘
                    │
                    ▼
┌─────────────────────────────────────────┐
│                                         │
│       ASSIGN CID TO A CONSUMER          │
│                                    110  │
└─────────────────────────────────────────┘
                    │
                    ▼
┌─────────────────────────────────────────┐
│                                         │
│    ASSOCIATE CID WITH AT LEAST ONE      │
│           PAYMENT VEHICLE               │
│                                    115  │
└─────────────────────────────────────────┘
```

*FIG. 1*

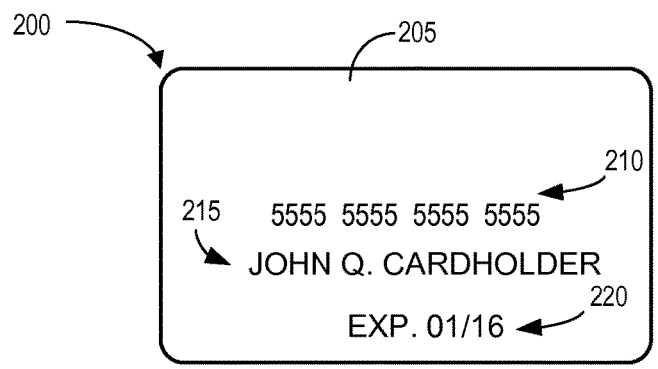

RECEIVE AN AUTHORIZATION REQUEST ASSOCIATED WITH A TRANSACTION INCLUDING TRANSACTION DETAILS OF AT LEAST A PAYMENT ACCOUNT NUMBER (PAN) AND A CONSUMER IDENTIFICATION (CID) VALUE THAT UNIQUELY IDENTIFIES A USER
705

STORE THE PAN AND THE CID
710

DETERMINE THE TRANSACTION DETAILS ARE TO BE PROCESSED AS AT LEAST A NON-FINANCIAL TRANSACTION
715

PROCESS, IN RESPONSE TO THE DETERMINATION THAT THE TRANSACTION DETAILS ARE TO BE PROCESSED AS AT LEAST A NON-FINANCIAL TRANSACTION, THE TRANSACTION DETAILS BASED ON THE CID WITHOUT USING THE PAN
720

*FIG. 7*

METHOD AND SYSTEM FOR SECURE CONSUMER IDENTIFICATION

BACKGROUND

Traditionally, a major concern of cardholders, merchants, issuers of payment cards (such as credit or debit cards) in a transaction is the security and safekeeping of the financial data transferred between the various entities involved in processing a transaction involving the use of the card. Typically, a primary account number (PAN) associated with the payment card is used to identify the particular cardholder account associated with the card and used for purchase transactions involving the card, as well to identify the cardholder. Since the PAN is typically used as an identifier of the cardholder, services and transactions that may leverage information relating to the purchase transaction have also typically used the PAN as a primary identifier of the cardholder in these other services and transactions.

In an effort to reduce the potential and/or real exposure to credit card fraud involving the misappropriation of PANs, a number of methods and systems have been used to safeguard the acquisition, transmission, and storage of PANs obtained and used in various transactions. Compliance with the applicable rules, standards, and regulations regarding the acquisition, transmission, and storage of PANs tend to be complex and costly to establish and maintain.

Merchants and/or third party servicers may seek to mitigate the risk of fraud by implementing different security mechanisms and features. However, the introduction and acceptance of new and different security mechanisms and features may be time-consuming and costly to implement, particularly if changes are required of processing systems and flows and/or cardholder behavior.

Therefore, it would be desirable to provide improved methods and apparatus for efficiently facilitating and processing card transactions without a reliance on PANs.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, wherein:

FIG. 1 is a flow diagram of an process, according to some embodiments herein;

FIG. 2 is an illustrative front view depiction of a payment card, according to some embodiments herein;

FIG. 7 is a flow diagram of an process, according to some embodiments herein.

DETAILED DESCRIPTION

Figure 3:
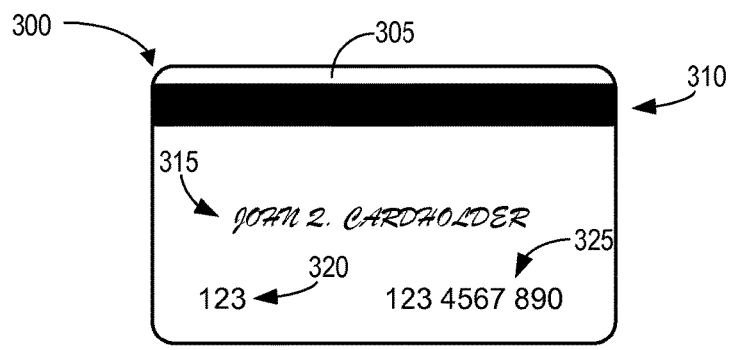
FIG. 3 is an illustrative rear view depiction of a payment card, according to some embodiments herein

In general, and for the purpose of introducing concepts of embodiments of the present disclosure, a payment vehicle refers to, in general, a payment device of any embodiment (e.g., a card, mobile telephone, a key fob, etc.) that may be used to store, present, and represent a primary account number (PAN) that may be used in a payment or purchase transaction. As used herein, the terms purchase transaction and payment transaction or simply transaction may be used interchangeably unless stated otherwise. In general, the purchase transactions herein refer to card present and card not present transactions, including for example e-commerce transactions.

In some aspects, one or more services may be provided to an entity that uses a payment vehicle in, for example, a purchase transaction. For example, the cardholder of a credit card may be enrolled in a loyalty program of a financial institution, a retailer, or a third party and earn loyalty points when using the credit card for certain transactions. As such, use of the credit card in the certain transactions may trigger or otherwise invoke one or more service transactions associated with the cardholder. In some embodiments, the service transactions may need to accurately identify the cardholder in order to render the service to the proper user. For example, in order to accurately implement a loyalty program's rules, scoring, servicing, and management, the loyalty program or service may need to accurately identify the cardholder. In some aspects, so long as the service transaction is provided with an accurate identification representation of the cardholder, the service transaction may not need to know or make use of a payment account number (PAN) associated with the credit card (or other payment vehicle). In addition to not needing to know the PAN, at least in the instance an accurate identification representation of the cardholder is otherwise provided, conveying the PAN to one or more of a financial institution, retailer, or third party may unnecessarily expose the PAN to potential security risks and/or trigger a requirement to comply with one or more financial data security measures.

In some embodiments herein, a service transaction may not need to know or make use of a PAN associated with a payment vehicle (e.g., credit card, debit card, e-wallet application, etc.), at least in the instance an accurate identification representation of the user or cardholder is otherwise provided. As used herein, a transaction or service that may use at least some transaction details of a transaction for non-financial purposes may be referred to as a service transaction. A non-financial, service transaction may be any service, transaction, or processing of information that does not directly use a PAN for financial purposes and/or identification purposes.

FIG. 1 is an illustrative diagram of a process 100 that may be utilized for supporting a secure consumer identification (CID) that facilitates processing of payment vehicle transactions without a reliance on a PAN associated with the payment vehicle as an identifier for the user of the payment vehicle. Process 100 includes an operation 105 to generate a value for a CID that will be assigned to, linked to, or otherwise associated with a particular consumer. The CID uniquely identifies a particular user entity. In some aspects, the CID identifies a specific individual person. In some instances, the CID may uniquely identify a specific business organization. A record of the CID generated at operation 105 and the basis for the generation thereof is saved for future reference in the processing of transactions that will be associated with the particular consumer user.

The CID generated at operation 105 may be accomplished by a payment network operator in some embodiments herein. In some aspects, the CID generated at operation 105 is associated with a particular consumer user, without any reliance or dependence on a particular PAN associated with the consumer user. The CID is not the same as a PAN or generated based on a PAN, including but not limited to being derived based on or calculated using an algorithm based on the PAN. The CID is generated independent of a PAN.

At operation 110, the CID generated at operation 105 is assigned to or otherwise associated with a particular consumer user. In some embodiments, operation 105 may generated a plurality of CIDs in a batch operation and each of the CIDs may then be assigned to a specific consumer user at operation 110. Operation 105 may include associating personal details of the specific consumer user that will be associated with a given CID in order to accurately and sufficiently identify the specific consumer user.

In some embodiments, the personal details of the specific consumer user that will be associated with a given CID may be obtained from a consumer user during a registration process that registers a consumer user with the secure CID. In some aspects, the registration process may include a registration process with a financial institution or a payment network operator that facilitates or administers processing of transactions that may include a CID. In some aspects, the registration process may include a registration process with a financial institution, merchant, or service provider such as, for example, a merchant's loyalty program that may be serviced and managed by the merchant, a payment network operator, or a third party servicer.

In some embodiments, the personal details of a specific consumer user that will be associated with a given CID may include at least one of the name, mailing address, mobile phone, personal code known only by the consumer user, and other detailed information personal to the consumer user.

Referring to FIG. 1, process 100 proceeds to operation 115 where the CID may be associated with one or more payment vehicles. The payment vehicles may include one or more of a credit card; a debit card; a charge card; a stored value card; a gift card; a "chip" card storing a PAN; a "fob" storing a PAN; an electronic wallet (e-wallet) device, program, or application; and other embodiments of a payment vehicle.

In some embodiments, the CID may be associated with more than one payment vehicle, wherein each payment vehicle has a PAN associated therewith. For each payment vehicle to which the CID may be associated, the CID may be used to primarily identify the consumer user and the PAN may be used to primarily identify a particular account of the user (e.g., cardholder). Accordingly, some embodiments herein provide a mechanism that separates the identification of a consumer user from the identification the consumer user's particular account associated with a payment vehicle.

FIG. 2 is an illustrative depiction of a frontal view of a card that may include a representation of a CID, in accordance with some embodiments herein. In some embodiments, the card shown in FIG. 2 might include, for example, a payment card, a credit card, a debit card, a loyalty program card, a badge, a license, a passport card, a radio frequency apparatus, and/or a contactless card. By way of example, FIG. 2 is an illustrative frontal view of a display card 200 payment device having a having a substantially planar card-shaped body 205, according to some embodiments of the present disclosure. In particular, illustrated is a substantially card-shaped body 205 that may comprise an International Standards Organization/International Electrotechnical Commission ("ISO/IEC") 7810 ID-1 sized card having a thickness of 0.76 mm (0.030 in) and a top area of 85.60× 53.98 mm (3.370×2.125 in) with rounded corners having a radius of 2.88-3.48 mm. However, this size and shape are provided for illustrative purposes only. Those skilled in the art, upon reading the present disclosure, will appreciate that other shapes, form factors, sizes, and configurations of card-shaped or other shaped bodies may be used in conjunction with embodiments of the present disclosure.

Card body 205 may be formed of one or more sheets of plastic or other materials. Card body 205 might be formed of different materials. It is noted that any of the embodiments described herein may be formed of other materials having appropriate properties compatible with this disclosure, such as strength, luminosity, and/or flexibility.

According to some embodiments, card 200 further includes a PAN 210 that is embossed or printed on a face of the card. In some embodiments, card 200 may further include a cardholder's name 215 and an expiration date(s) 220 that are embossed or printed on the front of the care.

FIG. 3 is an illustrative depiction of a rear view of a card 300, in accordance with some embodiments herein. In some embodiments, card 300 corresponds to the card depicted in FIG. 2. Card body 305 includes a magnetic stripe having data encoded therein. The data stored within the magnetic stripe may include payment credentials such as, but not limited to, the PAN of the cardholder and security code(s). In accordance with some aspects herein, the CID value and the PAN (e.g. 210) are encoded in magnetic stripe 310. The particular format of CID is not limited to a specific configuration in some embodiments herein. For example, the CID may be encrypted in some instances. In some embodiments, the data representation of the PAN and the CID may be separately stored within magnetic stripe 310. In some embodiment, the format or configuration of the CID (e.g., length, syntax, etc.) is compatible with existing card manufacturing, encoding, and processing systems and methods.

Card 300 may further include a signature block wherein the cardholder signs card 300 with their signature 315. In some embodiments, a security feature such as a security code 320 is embossed on card face 305. In some instances, security code 320 may be a two or three digit or any other number of digits security code.

In accordance with some embodiments herein, a CID value 325 assigned to the cardholder may be printed, laser-etched, embossed, or otherwise affixed to card face 305. The format of the CID value is not limited to the example shown in FIG. 3. In particular, the number of digits comprising the CID may differ from the illustrated example.

Figure 4:
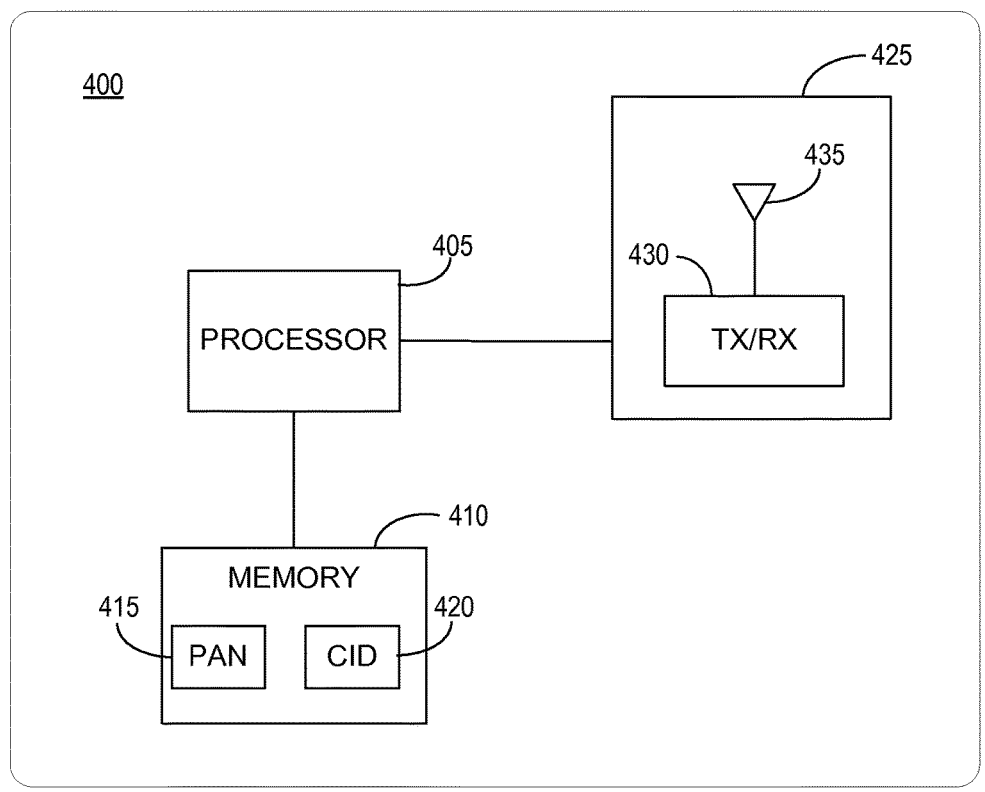
FIG. 4 is an illustrative depiction of a contactless payment card, according to some embodiments herein.

FIG. 4 is an illustrative schematic block diagram of a payment vehicle in accordance with some embodiments herein. In particular, FIG. 4 is a schematic diagram of a contactless, proximity payment device 400 according to some embodiments. Proximity payment device 400 may be sized and shaped like a conventional credit card or debit card, and may be primarily constructed of plastic or a composite material. Proximity payment device 400 includes a processor 405, at least one storage device 410, and a wireless communication interface 425. Storage device 410 may comprise any appropriate information storage device, including combinations of storage devices, for example, integrated circuits and/or semiconductor memory devices (such as Random Access Memory (RAM) devices and Read Only Memory (ROM) devices), flash memory, and a solid state drive. Storage device 410 may be any suitable computer readable medium and/or any form of non-transitory computer readable media capable of storing data, and in some implementations may also be capable of storing or configured to store computer instructions and/or application programs that are executable by a processor.

In some embodiments, storage device 410 may include memory space that stores at least a CID 415 and a PAN 420. Storage device 410 may also be configured to store additional other information that may be used in transactions, either financial and/or non-financial transactions. In some embodiments, storage device 410 may store one or more application programs and/or computer-readable instructions configured to instruct processor 405 to perform functions in accordance with one or more processes, including but not limited to those disclosed herein. In some embodiments, processor 405 may be a secure microcontroller. In some aspects, CID 415 and PAN 420 may be contained within one or more secure storage portions of storage device 410. Processor 405 may be configured to execute one or more pre-defined mobile device transaction programs or applications stored within the storage device 410, such as for example "app" configured to facilitate participation in a loyalty program or service.

Wireless communication interface 425 allows proximity payment device 400 to transmit and/or to receive signals. The signals transmitted by the wireless communication interface 425 may include a CID, a PAN, and/or other information stored in the memory or storage device 410. The signals received by wireless communication interface 425 may include an interrogation signal, a power signal and/or other signals. In some embodiments, wireless communication interface 425 may be configured to allow the proximity payment device 400 to operate in accordance with, for example, the well known standard for proximity payment devices that has been promulgated by MasterCard International Incorporated, the assignee hereof, and is referred to as "PayPass™".

In some embodiments, wireless communication interface 425 includes transmit/receive circuitry 430 and an antenna 435. Antenna 435 may be configured to transmit and receive radio frequency (RF) and/or other communication signals and may comprise a loop antenna and/or any other suitable device to facilitate reception and transmission of the signals. Transmit/receive circuitry 430 may be coupled between the antenna 435 and the processor 405.

In operation, wireless signals (for example, RF signals) may be received by antenna 435 and supplied to transmit/receive circuitry 430, which in response may provide signals that are supplied to processor 405. Processor 405 may provide signals that are supplied to the transmit/receive circuitry 430, which in response may provide signals that are supplied to the antenna 435 for wireless transmission to, for example, a proximity reader device associated with a POS terminal.

In some embodiments, wireless communication by card 400 may be based on a radio frequency identification (RFID) IC, near field communication (NFC), and other communication technologies.

In some embodiments, the contactless proximity payment device of FIG. 4 may be combined with other features of other payment vehicle devices. For example, the contactless card proximity payment device of FIG. 4 may include a magnetic stripe such as that disclosed in FIG. 1. Such a device may be referred to as a hybrid or dual interface payment device that includes both a contactless communication interface (e.g., RFID IC, NFC, etc.) and a contact interface (e.g., magnetic stripe, conductive contacts, etc.). A dual interface payment device may have the CID value and payment credentials stored in the magnetic stripe, a memory component of the payment device, and a combination thereof. In some embodiments, a contactless payment device having a CID value representation stored therein may include a display. The display may include one or more display technologies such as, for example, light emitting diodes, a thin film display, a liquid crystal display, an active-matrix organic light-emitting diode display, an organic light-emitting diode display, and others. In some embodiments, the CID may be presented in the display.

For example, card 400 may include one or more processors and one or memory devices (not shown).

Figure 5:
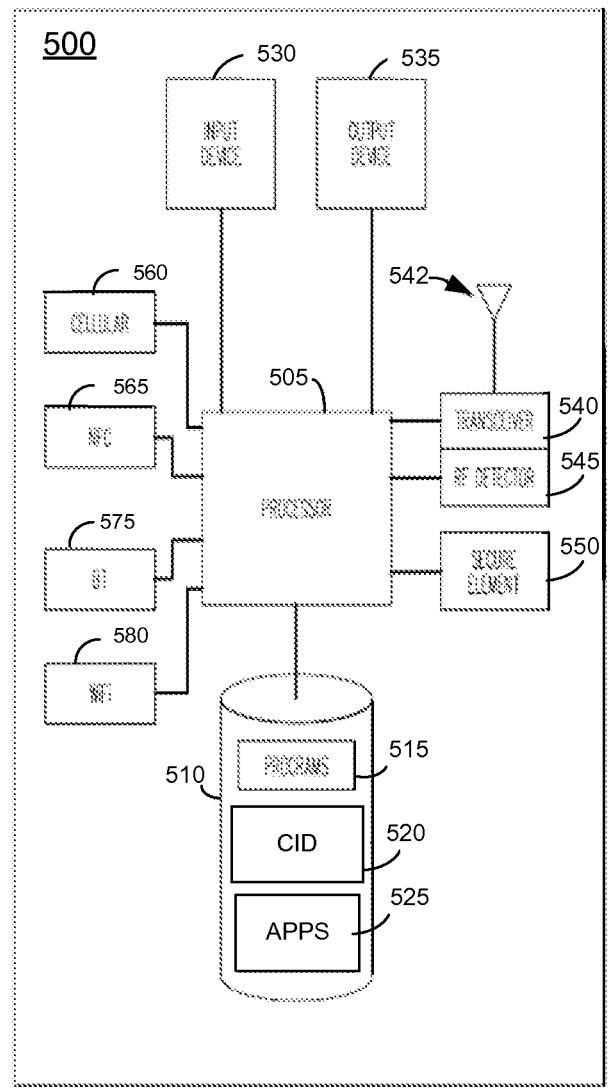
FIG. 5 is a block diagram of a mobile device, in accordance with some embodiments herein.

In some aspects herein, embodiments of a payment device may be embodied in an application, "app", program, a browser (or browser-enabled application, extension, or add-on, and service), non-transitory computer-readable instructions and the like executing on a mobile device, and a device having a processor to execute an application or program instructions. In some aspects, such devices may be said to be encompassed by disclosures herein referring to a "mobile device", even where such an electronic device may not necessarily be easily transported (e.g., a desktop PC). In some aspects, the mobile device may be a device including telephony functionality and implemented as any number of different hardware, software, and combination thereof configurations. For example, FIG. 5 is a block diagram of an apparatus, device, or system for a multifunctional mobile device 500 including a mobile or cellular telephone capability and a short-range wireless communication capability. FIG. 5 does not imply or necessarily represent a physical layout of mobile device 500. In its hardware and in some of its software/firmware, mobile device 500 may be substantially conventional. However, mobile device 500 may include hardware, software, firmware, and combinations thereof to implement and embody aspects of the present disclosure, including the methods and processes herein.

Mobile device 500 may include a conventional housing (not explicitly shown) that contains and/or supports the other components of the mobile telephone. The housing may, for example, be shaped and sized so as to be held in the user's hand. In some embodiments, device 500 may be housed in a device such as a tablet computing device and other form factors.

Mobile device 500 may include a processor 505 that processes and controls data in the mobile device that is interfaced with a memory 510 and capable of executing program instructions 515 stored in memory 510, a transceiver 540 for transmitting and receiving communication signals to and from antenna 542, and a RF detector 545 comprising part of the transceiver for detecting RF signals. Though not separately depicted in FIG. 5, memory 510 may include or encompass, in various embodiments, random access memory (RAM), read only memory (ROM), a SIM card, a solid state drive, flash memory, and other types and forms of data storage devices and media. The processes disclosed herein may be implemented by the components of mobile device 500. For example, memory 510 may store a CID value 520 under the control of processor 505 and programs 525 to effectuate various applications and services. The program instructions, programs, applications, and "apps" described herein and the data used thereby may be stored, at least in part, in a compressed, uncompiled and/or encrypted format.

Transceiver 540 may be coupled to antenna 542 and connects to the communication channel(s) by which mobile telephone 500 communicates via a mobile network (not shown). The transceiver is in communication with antenna 542 that may serve to transmit and receive wireless wide-range and short-range communication signals. Mobile telephone 500 may also include an input device 530 (e.g., a keypad, keyboard, touchscreen system, voice input components, etc.) for receiving inputs from a user, and an output device 535 (e.g., a speaker, an indicator light, a display, etc.) for providing an output of the mobile telephone to the user or other entities.

In conventional fashion, transceiver 540 operates to transmit, via antenna 542, voice signals received from a user through input device 530, and operates to reproduce, via output device 535 (e.g., a speaker), voice signals received via antenna 542. Transceiver 540 may also further operate to handle transmission and reception of text messages and/or other data communications via antenna 542. In some embodiments, mobile telephone 500 may transmit wireless communication signals in any frequency range and power, including those now used and those that may be used in the future without limit.

Mobile telephone 500 may be capable of communicating with another device via cellular telephone signals as provided by a cellular component or module 560 and a variety of short-range communication protocols, such as and by NFC signals as provided by NFC module or components 565 or the like, Bluetooth® as provided by a Bluetooth® module 575, and by a wireless local area network (e.g., Wi-Fi, based on IEEE 802.11 b/g/n or other standards) as provided by a Wifi module 580.

In some embodiments, mobile telephone 500 may be a NFC-enabled mobile telephone equipped to operate as a secure proximity payment device and interact/communicate with another device (not shown in FIG. 5) such as a ticket kiosk/device and a contactless-POS terminal or other device that may include a radio frequency identification ("RFID") tag. In some embodiments, the contactless-POS or other device and mobile telephone 500 may typically be positioned in close proximity of each other when communicating using NFC signals. In some aspects, the contactless-POS or other device and mobile telephone 500 may be within about 0-10 millimeters of each other in order for a RF power field generated by either the mobile telephone and the contactless-POS terminal or other device to transfer data therebetween.

In some embodiments, the methods and processes herein, including the functionality and operation of a mobile device or other wireless communication mobile device in accordance with the methods and processes herein related to a CID may be included, supplied, or otherwise provisioned with the mobile telephone or other wireless communication mobile device to operate independently of any other features of the mobile telephone or other wireless communication mobile device. In some aspects, at least some aspects of the mobile device's functionality to operate as a payment device may be stored or located in secure element 550. The configuration of secure element 550 may be provided in conformance with one or more industry "standards".

Regarding a device such as, for example, mobile device 500 herein, a user or cardholder may obtain an application or functionality for storing and transmitting a CID with the aid of the mobile device. In one embodiment, the payment device user may download a mobile "app" from an issuer, an "app" store or service compatible with the mobile device, or a third party to their mobile device. Once the payment device user is enabled to operate to obtain and store a CID, the user may link or otherwise associate their CID with one or more PANs with, for example, the assistance of an app executing on the mobile device, so that they can include their CID in a transaction use during an e-commerce shopping experience.

Figure 6:
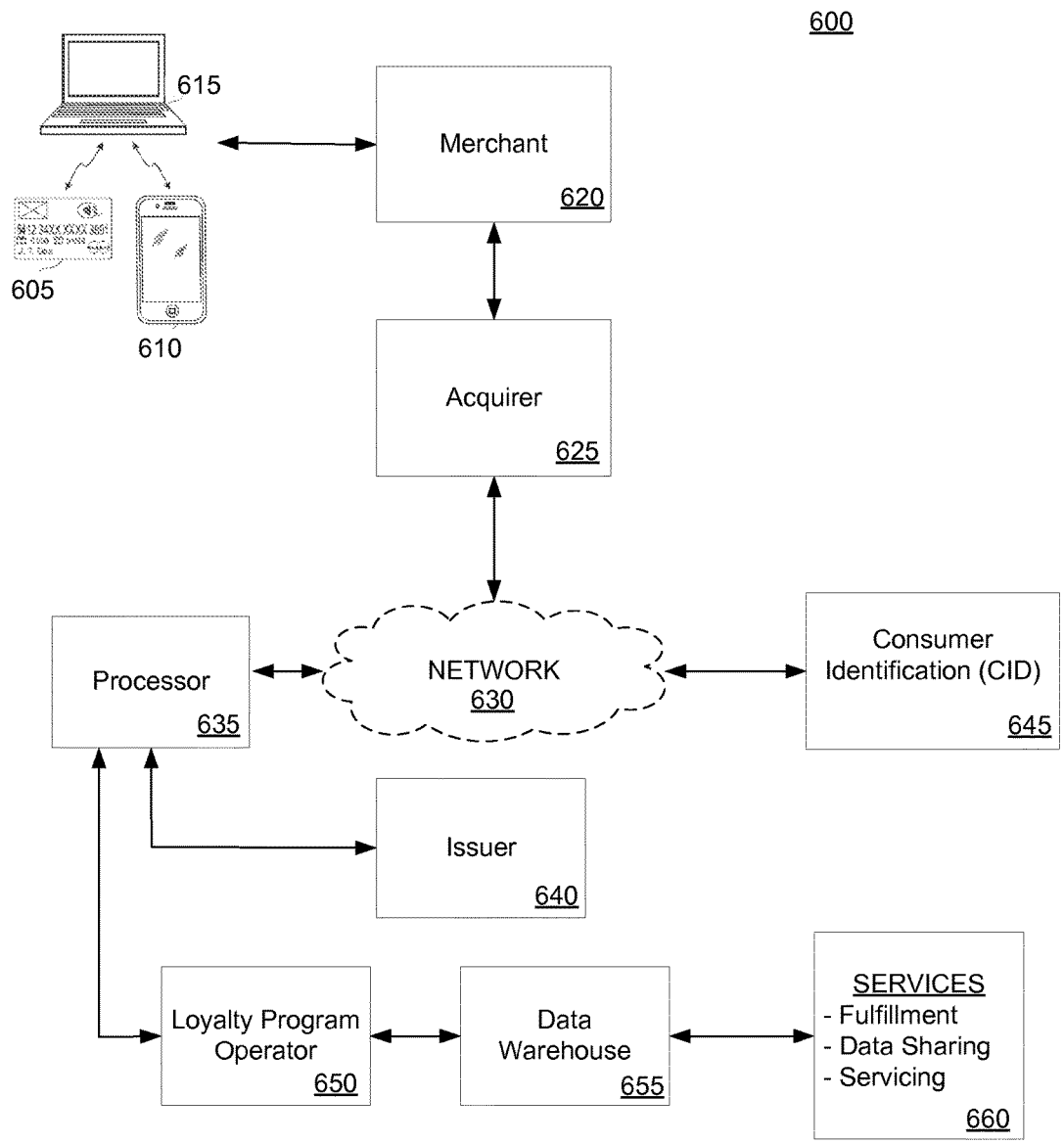
FIG. 6 is an illustrative depiction of a system, according to one embodiment herein.

FIG. 6 is a block diagram illustrating a CID enabled payment device and system 500 according to an embodiment herein. System 600 may be used to initiate and complete Internet-based, e-commerce, and other transactions in accordance with processes described herein. In some aspects, the CID stored on mobile device 610 may be automatically entered into an e-commerce shopping cart presence of a merchant 620 presented in an internet browser on computing device 615 and in some embodiments the CID may be entered into the merchant's system via a contact or contactless payment card or device reader (not shown). Computing device 615 which may be a laptop computer, desktop computer, tablet computing device and the like, is connected (wirelessly and/or via cables, such as fiber-optic cable, WiFi, etc.) to merchant 520. A consumer cardholder or user may provide payment information to the merchant during a checkout at the merchant's e-commerce site. The payment information may include a PAN (or proxy thereof), a security code value (e.g., a CVC), and other information. In some embodiments, the CID stored on card 605 and mobile device 610 may be transmitted to computing device 615 via a contact or contactless reader or entered via a user interface by the user. The user interface may comprise a touchscreen, a keypad, and keyboard, and speaker, and other user input devices.

The payment device or vehicle comprising card 605 may be a portable digital device, such as a key fob, a chip card, and some other token. In some aspects, the mobile device 610 having a mobile app executing thereon may include a tablet computing device, a multimedia player, a smartwatch, and the like.

Transaction details, including the payment information and the CID associated with and identifying the user, are transmitted to merchant 620. Merchant 620 receives the CID and the payment information including the PAN and other information (e.g., a card security value). Merchant 620 may forward an authorization request including the received CID to acquirer 625. In some aspects, merchant 620 may generate the transaction request in accordance with industry "standards" governing a purchase transaction including a PAN. An aspect of some embodiments herein includes the inclusion of a CID value in the authorization request in addition to the PAN. The CID is included in the authorization request to be used as the primary identifier of the user (e.g., cardholder or mobile payment device 610 user), whereas the included PAN will primarily be used as an indicator of the payment account to use in the transaction as a source of funds.

In accordance with some embodiments herein, the CID included in the authorization request may be a single value. The CID may be a string of a plurality of numeric values that is uniquely associated with one entity that serves to accurately authenticate the identity of that entity. The CID may be appended to a message (e.g., authorization request) to be routed to a payment network 630.

Referring still to FIG. 6, the authorization request is sent from merchant 620 to acquirer 625 who in turn routes the authorization request to payment network 630. Again, the authorization request includes the CID value in addition to payment credentials received from the merchant.

In some aspects, the payment network operator may, at least, route the authorization request to payment processor 635 that facilitates processing of payment transactions. In some embodiments, processor 635 may transmit the authorization request including the PAN to an issuer 640 for authorization (or denial) of the authorization request. The issuer may generate an authorization response in reply to the authorization request that is routed back to merchant 620 via payment network 630. In some embodiments, the acquirer, payment network operator, processor, and issuer may treat the authorization request including a CID and a PAN the same or similar to an authorization request only including a PAN from the perspective of processing a purchase transactions' authorization request.

In some aspects, payment network 630, and more particularly an operator of the payment network, may store the CID transmitted in the authorization request in a memory device or data store under its control. The CID may be stored with other information included in the authorization request, such as payment credentials (e.g., the PAN) and/or transaction details including but not limited to the merchant involved in the transaction, the details of the item(s) being purchased, etc.

In some embodiments, the payment network operator may determine by a computer or other processor-based machine whether the PAN received thereby is to be forwarded to other devices, systems, and entities. For example, the payment network operator may determine that the PAN received in an authorization request in connection with a purchase transaction is to be forwarded to issuer 640 for clearing and settlement purposes. In another example, the payment network operator may determine that the PAN received in an authorization request in connection with a purchase transaction need not be forwarded to loyalty program operator 650 that services and manages a loyalty program to which the user of payment device 605, 610 is a registered participant. It may be determined that PAN received in an authorization request (or other messages by other methods) need not be forwarded to the loyalty program operator and others since the loyalty program operator and others do not need to have the PAN since the CID that will be sent to them accurately and sufficiently identifies the user independently of the PAN. The CID operates to identify the user so that the PAN need not be used as an identifier of the user. Accordingly, since the loyalty program operator does not need the PAN to service and manage the user's loyalty program account (i.e., a non-financial transaction) if the user's identity is otherwise accurately known, then the loyalty program operator is provide the CID value without the PAN.

In some embodiments, the payment network operator may provide both the PAN and the CID to issuer 640. The process of routing the PAN to the issuer may be subject to one or more laws, regulations, and applicable industry "standards" that govern how securely the PAN must be stored, transmitted, and processed. As such, handling of the PAN by the issuer may be considered a secure operation given the processes and mechanisms implemented to safeguard the storage, transmission, and processing of the PAN. Given the security measures that may be used regarding the processing of the PAN sent to, for example, the issuer, the routing of a CID along with the PAN may also be considered a secure operation.

In some embodiments herein, the CID may be generated by the payment network provider or another entity at 645. The CID may be generated at 645 and provided to the payment network provider at 630. In the instance the CID is generated by the payment network provider at 630, there may or may not be a separation between network 630 and the generation of the CID at 645. In some embodiments, the CID may be received from 645 during an initial CID generation and/or registration process. The CID registration process may include associating the CID with a particular user entity and/or associating the CID with one or more PANs.

In some embodiments, the payment network operator may provide only the CID to loyalty program operator 650 and other third-party entities. In some aspects, the process of routing the CID may alleviate the need or requirement to adhere to the one or more laws, regulations, and applicable industry "standards" that govern how securely the PAN must be stored, transmitted, and processed. As such, processing of the CID (without the PAN) by the loyalty program operator may be less complex and possibly burdensome since the PAN is not transmitted to the loyalty program operator or others for non-financial transactions.

Referring still to FIG. 6, the CID value and other details associated with the purchase transaction other than the payment credentials (e.g., the PAN) may be stored in data warehouse 655. Once stored, this information may be used for a variety of non-financial service transactions. Such transactions may include but not be limited to fulfillment, data sharing, and servicing of a loyalty program and other services.

FIG. 7 is an illustrative depiction of a process 700 related to aspects of processing a transaction including a CID, in accordance with some embodiments herein. At operation 705, an authorization request associated with a transaction is received by, for example, a merchant. As discussed at other points herein, the transaction may include a payment vehicle of various implementations. Accordingly, the consumer cardholder user may be asked to provide their PAN. In accordance with some the user may also be asked to provide their CID. In some embodiments, the PAN and the CID may be provided in an authorization request, wherein the PAN and CID are automatically obtained from the storage mechanism of the payment vehicle (e.g., magnetic stripe, memory device, chip, etc.). The authorization request may further include additional transaction details related to the transaction such as a merchant identifier, line item details related to the item(s) being purchased, etc. In some aspects, at least the PAN and CID value are included in the authorization request, although additional information may also be included. Inclusion of the CID provides a mechanism for uniquely identifying the payment vehicle's user that is separate and independent of the PAN.

At operation 710, the PAN and CID may be stored by a payment network operator in a memory device, system, or facility. The PAN and CID may be stored for further use, where such use of the PAN and CID may be independent of each other. Independent use of the PAN and CID is facilitated by aspects disclosed herein since the PAN may be used primarily as an identifier of a payment account associated with the payment vehicle user and not as an identifier of the payment vehicle user. The CID however may indeed be used primarily as an identifier of the payment vehicle user, independent and without any reliance on the PAN. The CID uniquely identifies the payment vehicle user and may be associated with one or more PANs.

Continuing with process 700, operation 715 may include a determination of whether the transaction details are to be processed as at least a non-financial transaction. In the instance the transaction details received in the authorization request are to be processed as a non-financial transaction, those transaction details may be stored, processed, and transmitted to various entities with the CID included therein to act as an identifier of the payment vehicle user. The non-financial transaction may not need to know the payment credentials associated with the transaction and as such, the PAN need not be stored, processed, and transmitted to various entities wherein the PAN would primarily be used as an identifier of the payment vehicle user.

In the instance the transaction details received in the authorization request of operation 705 are to be processed as a financial transaction, requiring the knowledge of the payment details associated with the transaction, then the PAN may be may be stored, processed, and transmitted to various entities to act as an identifier of the payment account associated with the payment vehicle. In some embodiments, the CID may also be transmitted and processed in connection with at least some financial transactions.

At operation 720, in response to the determination that the transaction details are to be processed as at least a non-financial transaction, the transaction details are processed based on the CID without using the PAN. In this manner, the PAN need not be stored, transmitted, and stored by entities that need not know the payment credentials associated with various transactions due to the separation of payment vehicle user identifier and payment credential identifier provided by the CID and PAN, respectively.

Figure 8:
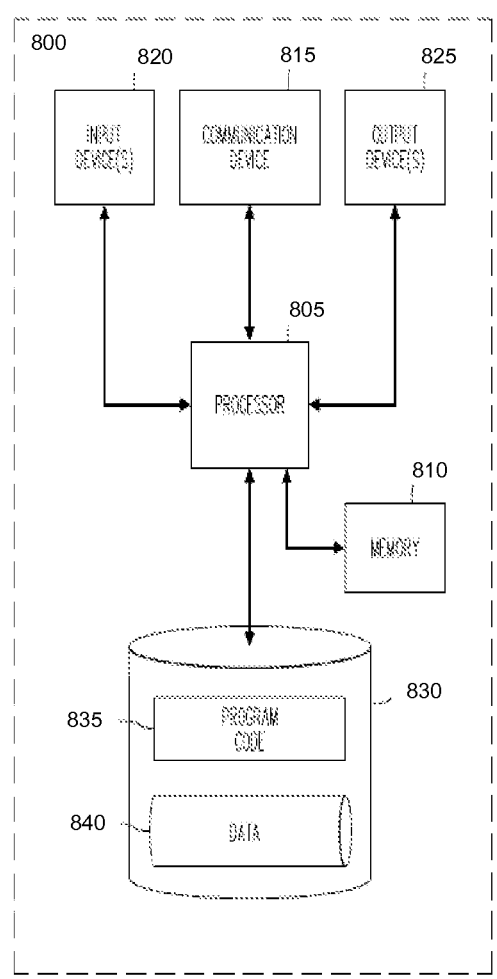
FIG. 8 is schematic block diagram of an apparatus, according to some embodiments herein.

FIG. 8 is a block diagram overview of a system or apparatus 800 according to some embodiments. System 800 may be, for example, associated with any of the devices described herein, including for example a merchant system device and an application server supporting or providing a CID generation, storage, processing, and transmitting. System 800 comprises a processor 805, such as one or more commercially available Central Processing Units (CPUs) in the form of one-chip microprocessors or a multi-core processor, coupled to a communication device 815 configured to communicate via a communication network (not shown in FIG. 8) to another device or system. In the instance system 800 comprises a server (e.g., supporting the functions and services provided by a card verifier entity), communication device 815 may provide a means for system 800 to interface with a client device (e.g., a merchant system device). System 800 may also include a local memory 810, such as RAM memory modules. The system further includes an input device 820 (e.g., a touchscreen, mouse and/or keyboard to enter content) and an output device 825 (e.g., a touchscreen, a computer monitor to display, a LCD display).

Processor 805 communicates with a storage device 830. Storage device 830 may comprise any appropriate information storage device, including combinations of magnetic storage devices (e.g., a hard disk drive), optical storage devices, solid state drives, and/or semiconductor memory devices. In some embodiments, storage device may comprise a database system.

Storage device 830 stores program code 835 that may provide computer executable instructions for processing a transaction including, in some aspects a CID received in an authorization request for a particular transaction involving a PAN, in accordance with processes herein. Processor 805 may perform the instructions of the program code 835 to thereby operate in accordance with any of the embodiments described herein. Program code 835 may be stored in a compressed, uncompiled and/or encrypted format. Program code 835 may furthermore include other program elements, such as an operating system, a database management system, and/or device drivers used by the processor 805 to interface with, for example, peripheral devices. Storage device 830 may also include data 840 such as database records or look-up tables, including records including a CID. Data 840 may be used by system 800, in some aspects, in performing the processes herein, including the storage, processing, and transmission of the CID.

All systems and processes discussed herein may be embodied in program code stored on one or more non-transitory computer-readable media. Such media may include, for example, a floppy disk, a CD-ROM, a DVD-ROM, magnetic tape, solid state drives, and solid state Random Access Memory (RAM) or Read Only Memory (ROM) storage units. According to some embodiments, a memory storage unit may be associated with access patterns and may be independent from the device (e.g., magnetic, optoelectronic, semiconductor/solid-state, etc.) Moreover, in-memory technologies may be used such that databases, etc. may be completely operated in RAM memory at a processor. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method comprising:
   receiving, by a payment network device, an authorization request message associated with a payment transaction, the authorization request message comprising transaction details, a payment account number (PAN) and a consumer identification (CID) value associated with the PAN, the CID comprising an identifier that is not payment enabled and that uniquely and separately identifies a cardholder corresponding to the PAN without identifying the PAN;
   transmitting, by the payment network device, the authorization request message including the transaction details and the PAN to an issuer computing system for processing the payment transaction;
   determining, by the payment network device, that the transaction details are to be further processed in a loyalty program transaction for the cardholder based on processing of the payment transaction; and
   determining, by the payment network device, not to use the PAN from the transaction details to identify the cardholder for the loyalty program transaction but instead use the CID to represent the identity of the cardholder in response to identifying that the cardholder is previously registered to the CID in a storage device and identifying that the CID is associated with the PAN in the storage device, generating a modified authorization request message with the PAN removed, and forwarding the authorization request message to a loyalty program operator computing system to settle the loyalty program transaction for the cardholder, the forwarded authorization request message including the transaction details and the CID, and not including the PAN.

2. The method of claim 1, wherein the CID is a single value comprising a string of a plurality of numerals.

3. The method of claim 2, wherein the string of the plurality of numerals is not based on the PAN.

4. The method of claim 1, wherein the CID is further associated with at least one additional other PAN.

5. The method of claim 1, wherein the CID is received from a payment vehicle at a point of a sale for a merchant.

6. The method of claim 5, wherein the payment vehicle comprises at least one of a card having a magnetic stripe to store the PAN and CID, a card having a memory to store the PAN and CID, a device having a memory to store the PAN and CID, and a device having a display to present the PAN and CID.

7. The method of claim 1, wherein the CID is received from a payment network operator device.

8. The computer-implemented method of claim 1, wherein the CID is commonly used to coordinate a loyalty program for a plurality of different PANs corresponding to a plurality of different payment accounts of the cardholder.

9. The computer-implemented method of claim 1, wherein the forwarding of the CID coordinates management and service of a loyalty program of the cardholder by the loyalty program operator without identifying the PAN of the cardholder.

10. A payment processing apparatus comprising:
a processor; and
a memory device in communication with the processor and storing program instructions thereon, wherein, when executed, the program instructions cause the processor to:
receive an authorization request message associated with a payment transaction, the authorization request message comprising transaction details, a payment account number (PAN) and a consumer identification (CID) value associated with the PAN, the CID comprising an identifier that is not payment enabled and that uniquely and separately identifies a cardholder corresponding to the PAN without identifying the PAN;
transmit the authorization request message including the transaction details and the PAN to an issuer computing system for processing the payment transaction;
determine that the transaction details are to be further processed in a loyalty program transaction for the cardholder based on processing of the payment transaction; and
determine not to use the PAN from the transaction details to identify the cardholder for the loyalty program transaction but instead use the CID to represent the identity of the cardholder in response to identifying that the cardholder is registered to the CID in the memory and identifying that the CID is associated with the PAN in memory, generate a modified authorization request message with the PAN removed, and forward the authorization request message to a loyalty program operator computing system to settle the loyalty program transaction for the cardholder, the forwarded authorization request message including the transaction details and the CID, and not including the PAN.

11. The apparatus of claim 10, wherein the CID is a single value comprising a string of a plurality of numerals.

12. The apparatus of claim 11, wherein the string of the plurality of numerals is not based on the PAN.

13. The apparatus of claim 10, wherein the CID is further associated with at least one additional other PAN.

14. The apparatus of claim 10, wherein the CID is received from a payment vehicle at a point of a sale for a merchant.

15. The apparatus of claim 14, wherein the payment vehicle comprises at least one of a card having a magnetic stripe to store the PAN and CID, a card having a memory to store the PAN and CID, a device having a memory to store the PAN and CID, and a device having a display to present the PAN and CID.

16. The apparatus of claim 10, wherein the processor is further operative to generate the CID.

* * * * *